(No Model.)
J. D. BLAKELEY.
APPARATUS FOR MANUFACTURING GAS.
No. 512,270. Patented Jan. 9, 1894.
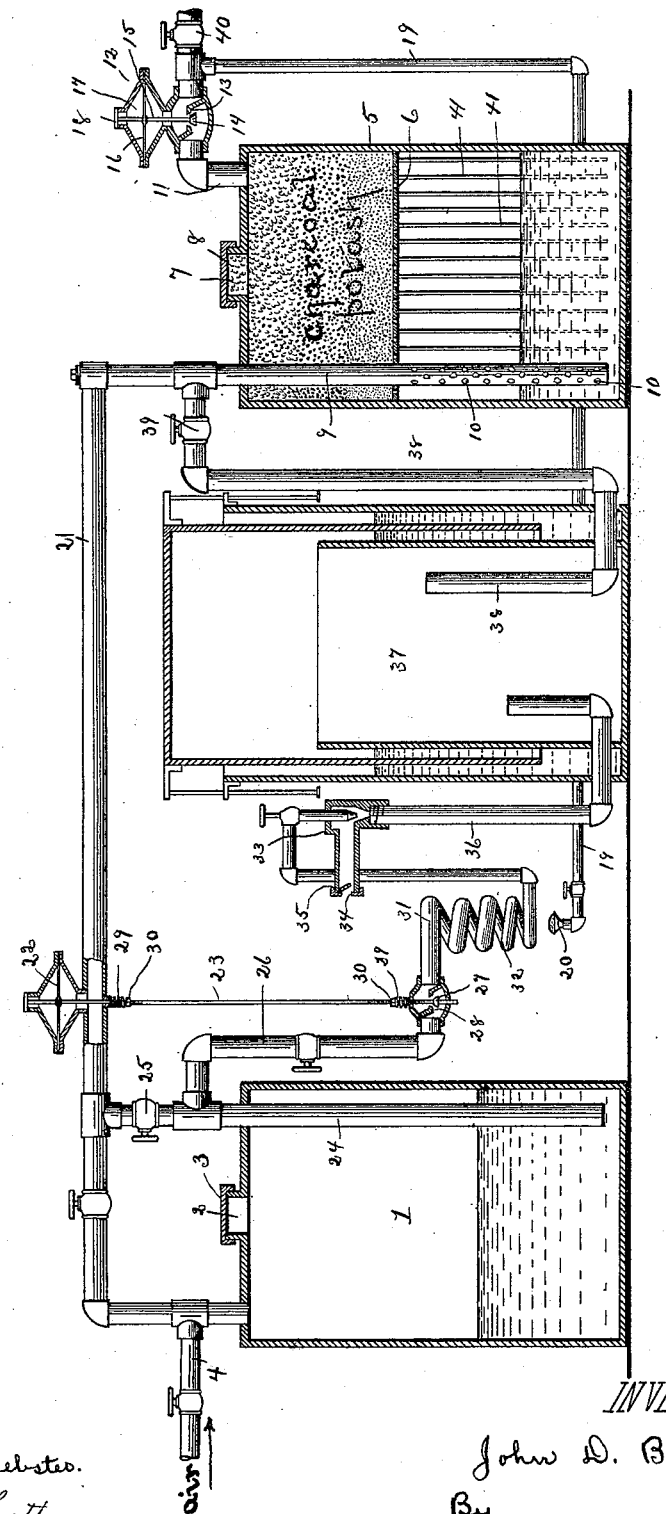
WITNESSES
Carroll J. Webster.
Sherman W. Lott.
INVENTOR
John D. Blakeley
By William Webster
Atty.

ated rst # UNITED STATES PATENT OFFICE.

JOHN D. BLAKELEY, OF TOLEDO, OHIO, ASSIGNOR TO JOHN W. FLUKE, ALFRED C. NEEL, AND FRANK B. LOSEE, OF SAME PLACE.

APPARATUS FOR MANUFACTURING GAS.

SPECIFICATION forming part of Letters Patent No. 512,270, dated January 9, 1894.

Application filed May 7, 1892. Serial No. 432,132. (No model.)

*To all whom it may concern:*

Be it known that I, JOHN D. BLAKELEY, of Toledo, county of Lucas, and State of Ohio, have invented certain new and useful Improvements in Apparatus for Manufacturing Gas; and I do hereby declare that the following is a full, clear, and exact description of the invention, which will enable others skilled in the art to which it appertains to make and use the same, reference being had to the accompanying drawing, and to the figures of reference marked thereon, which forms part of this specification.

My invention relates to an apparatus for manufacturing gas, and has for its object to produce a gas for illuminating purposes, from a hydro-carbon and aeriform base.

The invention consists in the parts and combination of parts hereinafter described and pointed out in the claims.

In the drawing:—the figure is a longitudinal vertical view of the apparatus.

1 designates a tank containing oil and provided with an opening 2 at the top closed by cap 3, and a pipe 4 connected with any preferred form of air pump by which to force air into the tank under pressure.

5 designates the carburetor, comprising a tank having a transverse foraminous diaphragm 6 intermediate its height, the top being formed with an opening 7 closed by a cap 8, and a pipe 9 screwed into the top and extending to near the bottom of the tank, the portion of the pipe below the diaphragm being formed with a plurality of perforations 10.

Upon the opposite side of the top of the tank there is a pipe 11 tapped through the top and provided with a regulator 12, comprising a valve seat 13, and valve 14, having a stem 15, secured to a diaphragm 16, arranged transversely of a chamber 17, the stem extending through the top of the chamber to receive one or more weights 18, to adjust the regulator to any desired degree of sensitiveness. Beyond the regulator there is a pipe 19, tapped into pipe 11, which extends to near the bottom of the tank parallel with the side, and then at right angles thereto parallel with the base of the tank to a point intermediate the two tanks, and is then turned at right angles and provided with a burner 20.

At the top of pipe 9 there is a pipe 21 extending at right angles to pipe 9, and connecting at the opposite end with the pipe 4, and on said pipe is a regulating diaphragm 22 to which is connected a valve stem 23.

Extending to near the base of tank 1, and extending above the same is a pipe 24 which is tapped into pipe 21 at the upper end and is provided with a valve 25. Below the valve 25 there is tapped a pipe 26, having a valve casing on the lower end, in which works a valve 27 upon the stem 23, adapted to be seated upon valve seat 28, when diaphragm 22 is raised, the valve being adjusted to allow of the desired degree of sensitiveness to the diaphragm by means of springs 29 upon the valve stem, regulated as to tension by nuts 30. There is screwed into the opposite end of the valve casing a pipe 31 formed with a coiled portion 32 extending vertically above the burner, and directly over the same, so that the flame from the burner will impinge upon the pipe of the coil. The opposite end of pipe 31 extends into an injector 33 there being a depending pipe provided with a valve seat 34 against which rests flat valve 35 hinged to the seat. From the injector leads a pipe 36, to and in the gasometer 37, which is of the ordinary construction now used, there being a pipe 38 leading from the gasometer and tapped into the pipe 9 leading into the carburetor and is provided with a valve 39.

41 designates strips of flannel, or any analogous material adapted to absorb the petroleum distillate by capillary attraction, the strips being secured to diaphragm 6, upon the carburetor, a suitable quantity of petroleum distillate having been introduced therein. Cock 40 in pipe 11 being closed cock 25 in pipe 24 is opened, and oil and air are forced into the carburetor through pipes 21, 24 and 9; which after impinging upon the saturated strips of fabric and the air becoming saturated with hydrocarbon rises through the granular filling into pipes 11 and 19 to the burner 20, where it is ignited the flame surrounding the worm and quickly vaporizing the oil therein, oil being siphoned into the coil through the action of heat, and the air as it is forced through pipe 21 also helps to raise the oil as far as the pipe 26. Cock 25 is now closed and cock 40 opened, and the vapor rising through the vertical portion of the pipe 31 into injector 33, and by the rarefaction of air within the injector causes an influx of air into the injector through the valve port caused by the opening of valves 34, said valves closing automatically when the supply of gaseous vapor ceases, thereby preventing the escape of gas from the carburetor. The combined hydrocarbon vapor and air enters gasometer 37 and passes through pipe 38 down pipe 9 into the carbureting chamber where it impinges upon the capillary strips 41, and becomes saturated with hydrocarbon, and from thence passes through the granular filling into pipe 11 and is led to a place of storage or combustion. In the passage of the now thoroughly enriched gas, through the granular packing, the charcoal and potash mixed near the diaphragm 6 of the first stratum absorbs any particles of oil that may be incorporated therewith, as well as carbonic gas, or condensible properties, while the second stratum gives off the oxygen contained in the potash, and the top layer by its affinity for the sulphur removes the same, and the gas passes into pipe 11 in a condition freed from all refractory properties. Should the feed of oil to the coil exceed the demand the increased pressure in pipe 21 soon acts upon diaphragm 22 and closes, or partially closes valve 27, there being a like action upon diaphragm 16 and valves 14, whereby there is insured an even supply of gas to pipe 11.

It will be apparent that I may construct the coil of a length, and the burner 20 of a capacity to thoroughly "fix" any amount of gas desired from the vaporization of the oil.

While I have described the gas manufactured as particularly adaptable for illuminating purposes, it can be also used as a fuel in the ordinary summer or gas stoves.

What I claim is—

1. The combination with an oil tank, of a gasometer and carburetor, an air supply pipe leading into the oil tank a pipe leading from oil tank to the carburetor, a pipe leading from the oil tank to the gasometer and provided with an air and gas injector, a pipe leading from the gasometer to the carburetor, and a pipe leading from the carburetor, and provided with a burner beneath the pipe leading from the oil tank to the gasometer.

2. The combination with an oil tank and a carburetor, of a gasometer, an air supply pipe leading into the oil tank pipes leading from the oil tank to the gasometer and carburetor, an air and gas injector arranged in the pipe leading from the oil tank to the gasometer a regulator valve in each pipe, and a pipe leading from the carburetor and provided with a burner beneath the pipe leading to the gasometer.

3. The combination with an oil tank, gasometer and carburetor, of a pipe leading from the tank to the carburetor, a pipe leading from the tank to the gasometer, and a pipe leading from the gasometer to the carburetor, a pipe leading from the carburetor and provided with a burner, a regulating valve in the pipe extending to the carburetor from the tank, and a regulating valve in the pipe extending from the tank to the gesometer.

In testimony that I claim the foregoing as my own I hereby affix my signature in presence of two witnesses.

JOHN D. BLAKELEY.

Witnesses:
WILLIAM WEBSTER,
CARROLL J. WEBSTER.